United States Patent Office 3,341,603
Patented Sept. 12, 1967

3,341,603
CATALYTIC OXIDATION OF COMPOUNDS CONTAINING AN OLEFINIC GROUP
Wilbur K. Leaman, Medford Lakes, N.J., assignor to Mobil Oil Corporation, a corporation of New York
No Drawing. Filed Jan. 14, 1963, Ser. No. 251,045
7 Claims. (Cl. 260—592)

This application is a continuation-in-part of copending application Ser. No. 2,599, filed Jan. 15, 1960, and now abandoned.

This invention relates to a process for catalytically oxidizing compounds containing an olefinic group in the presence of a unique catalyst. More particularly, the present invention is concerned with a method wherein an organic compound containing an olefinic group undergoes oxidation to an oxygenated reaction product in the presence of a solid porous crystalline aluminosilicate zeolite catalyst.

Techniques for converting various organic compounds to oxygen-containing reaction products have long been known. For example, it is known that a variety of organic materials containing an olefinic group may be oxidized to form a variety of reaction products. Thus, olefins, grouped according to their structure, may be exhaustively oxidized as follows:

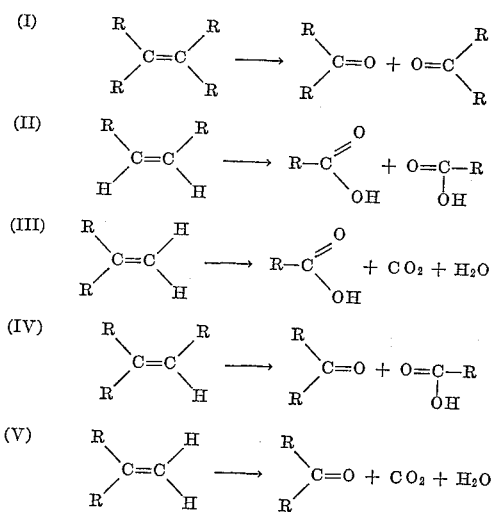

While simple and straightforward oxidation techniques such as are represented by the above equations would appear to be desirable for forming oxygen-containing compounds such as ketones, however, a variety of other techniques have been more usually employed. For example, ketones are usually prepared either by dry distillation of the calcium or barium salts of the carboxylic acids or the oxidation of secondary alcohols in accordance with the respective equations shown below:

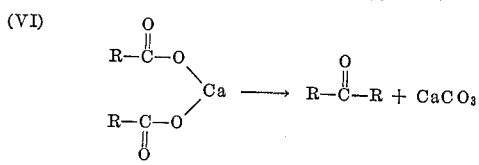

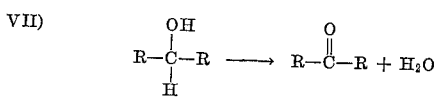

Similarly, mixed aromatic-aliphatic ketones such as, for example, acetophenone are often prepared by the alkylation of an aromatic hydrocarbon with acetic acid anhydride or an acetyl halide in the presence of a Friedel-Crafts catalyst in accordance with the following equations:

(VIII)
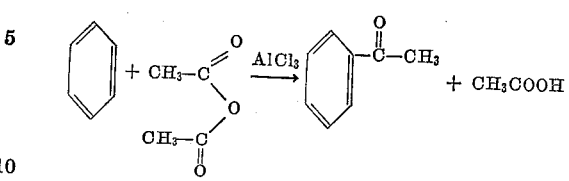

(IX)
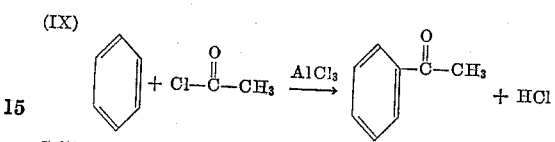

Still further, aromatic ketones such as benzophenone are often prepared by the alkylation of an aromatic hydrocarbon with benzoyl chloride in the presence of a Friedel-Crafts catalyst or by reaction of such hydrocarbon with phosgene in accordance with the following equations:

(X)
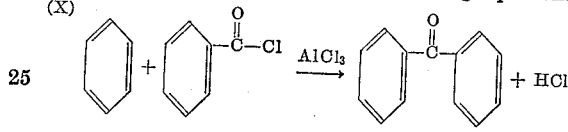

(XI)
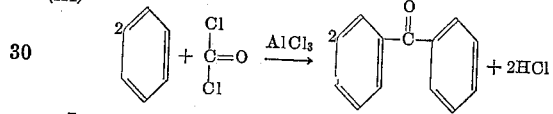

In accordance with the present invention, a new and improved technique has now been discovered for converting various organic compounds to oxygen-containing reaction products which permits a direct and commercially attractive approach to the problem of forming such products. More specifically, it has now been discovered that organic compounds containing an olefinic group can be directly oxidized to a variety of oxygenated reaction products by means of a unique catalyst in the form of a solid, porous crystalline aluminosilicate zeolite.

It is accordingly a primary object of the present invention to provide a novel method for the direct oxidation of organic compounds containing an olefinic group by means of a solid, porous crystalline aluminosilicate zeolite catalyst.

It is another important object of the present invention to provide a novel method for the oxidation of an organic compound containing a tertiary olefinic group to form a ketone by means of a solid, porous crystalline aluminosilicate zeolite catalyst.

It is a further important object of the present invention to provide a novel method for the oxidation of an olefin to form an oxygenated reaction product by means of a solid, porous crystalline aluminosilicate zeolite catalyst.

It is still a further object of the present invention to provide a novel process for the oxidation of an olefin to form a ketone by means of a solid, porous crystalline aluminosilicate zeolite catalyst.

It is still a further object of the present invention to provide a novel process for the oxidation of a tertiary olefin to form a ketone by means of a solid, porous crystalline aluminosilicate zeolite catalyst.

These and other important objects and advantages of the present invention will become more apparent in light of the ensuing description and appended claims.

As previously indicated, the broad essence of the present invention is the use of solid, porous crystalline aluminosilicate zeolites as catalysts to directly oxidize organic compounds containing an olefinic group to an oxygenated reaction product or products. While the invention is thus broadly applicable to such organic, olefinic group-containing reactants, however, particularly effective results are obtained through the use of the catalysts of the present invention in converting such reactants to ketones.

In general, the most widely applicable use of the novel process of the present invention is in the conversion of tertiary olefins to ketones. For example, a particularly advantageous olefinic starting material is a tertiary olefin characterized by the general formula:

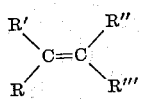

where R and R' are hydrocarbon substituents selected from the group consisting of alkyl radicals having from 1 to 18 carbon atoms and aryl radicals containing from 6 to 20 carbon atoms, and R'' and R''' are substituents selected from the group consisting of hydrogen, R and R', as above defined.

Representative tertiary olefins which may be employed as starting materials in the process of the present invention include, merely, by way of example, alpha-methylstyrene, 2-ethylhexene-1, 3-ethylhexene-2, 2,3-dimethylhexene-2, diphenylethylene, triphenylethylene, 2-methylpropene-1, 2-ethylpropene-1, 2-ethylbutene-1, 2-propylbutene-1, 2-phenylbutene-1, dimethylethylene, diethylethylene and tetraphenylethylene.

Other representative organic compounds containing an olefinic group and which are useable in the process of the present invention include, for example, octene-1, decene-2, styrene and 4-phenyl butene-1. As will be apparent, by using such non-tertiary olefinic compounds, reaction products other than ketones, i.e., aldehydes, may be formed by the process of the present invention. For example, among other products, aldehydes which would be formed by the above-mentioned non-tertiary olefins would be respectively heptyl aldehyde, nonyl aldehyde, benzyl aldehyde and 3-phenyl propionaldehyde.

The aluminosilicates useable as catalysts in accordance with the present invention include a wide variety of positive ion-containing crystalline aluminosilicates, both natural and synthetic. These aluminosilicates can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, $Na_2$, $K_2$ or $Li_2$ is equal to unity. One cation may be exchanged either in entirety or partially by another cation utilizing ion exchange techniques as discussed hereinbelow. By means of such cation exchange, it is possible to vary the size of the pore in the given aluminosilicate by suitable selection of the particular cation. The spaces between the tetrahedra are occupied by molecules of water prior to dehydration.

A description of zeolites of the type useable in the present invention is found in Patent 2,971,824, whose disclosure is hereby incorporated herein by reference. These aluminosilicates have well-defined intra-crystalline dimensions such that only reactant or product molecules of suitable size and shape may be transported in either direction between the exterior phase and the interior of the crystalline zeolite.

In their hydrated form, the aluminosilicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$, the removal of which produces the characteristic open network system. The cation may be any one or more of a number of positive ions as aforesaid, such ions being discussed in greater detail hereinafter. The parent zeolite is dehydrated to actuate it for use as a catalyst. Although the proportions of inorganic oxides in the silicates and their spatial arrangement may vary, effecting distinct properties in the aluminosilicates, the main characteristic of these materials is their ability to undergo dehydration without substantially affecting the $SiO_4$ and $AlO_4$ framework. In this respect, this characteristic is essential for obtaining catalyst compositions of high activity in accordance with the invention.

Representative materials include a synthetic faujasite, designated Zeolite X, which can be represented in terms of mole ratios of oxides as follows:

$$1.0 \pm 0.2 M_{2/n}O:Al_2O_3:2.5 \pm 0.5 SiO_2:yH_2O$$

wherein M is a metal cation having a valence of not more than three, $n$ represents the valence of M, and $y$ is a value up to eight depending on the identity of M and degree of hydration of the crystal. The sodium form may be represented in terms of mole ratios of oxides as follows:

$$0.9Na_2O:Al_2O_3:2.5SiO_2:6.1H_2O$$

Another synthesized crystalline aluminosilicate, designated Zeolite A, can be represented in mole ratios of oxides as:

$$1.0 \pm 0.2 M_{2/n}O:Al_2O_3:1.85 \pm 0.5 SiO_2:yH_2O$$

wherein M represents a metal cation, $n$ is the valence of M, and $y$ is any value up to about 6. As usually prepared, Zeolite A contains primarily sodium cations and is designated sodium Zeolite A.

Other suitable synthesized crystalline aluminosilicates are those designated Zeolite Y, L and D.

The formula for Zeolite Y (which is a synthetic faujasite) expressed in oxide mole ratios is:

$$0.9 \pm 0.2 Na_2O:Al_2O_3:wSiO_2:yH_2O$$

wherein $w$ is a value ranging from 3 to 6 and $y$ may be any value up to about 9.

The composition of Zeolite L in oxide mole ratios may be represented as:

$$1.0 \pm 0.1 M_{2/n}O:Al_2O_3:6.4 \pm 0.5 SiO_2:yH_2O$$

wherein M designates a metal cation, $n$ represents the valence of M, and $y$ is any value from 0 to 7.

The formula for Zeolite D, in terms of oxide mole ratios, may be represented as:

$$0.9 \pm 0.2 [xNa_2O:(1-xK_2O]:Al_2O_3:wSiO_2:yH_2O$$

wherein $x$ is a value of 0 to 1, $w$ is from 4.5 to about 4.9 and $y$, in the fully hydrated form, is about 7.

Other synthetic crystalline aluminosilicates which can be used include those designated as Zeolite R, S, T, Z, E, F, Q and B.

The formula for Zeolite R in terms of oxide mole ratios may be written as follows:

$$0.9 \pm 0.2 Na_2O:Al_2O_3:wSiO_2:yH_2O$$

wherein $w$ is from 2.45 to 3.65, and $y$, in the hydrated form, is about 7.

The formula for Zeolite S in terms of oxide mole ratios may be written as:

$$0.9 \pm 0.2 Na_2O:Al_2O_3:wSiO_2:yH_2O$$

wherein $w$ is from 4.6 to 5.9 and $y$, in the hydrated form, is about 6 to 7.

The formula for Zeolite T in terms of oxide mole ratios may be written as:

$$1.1 \pm 0.4 xNa_2O:(1-x)K_2O:Al_2O_3:6.9 \pm 0.5 SiO_2:yH_2O$$

wherein $x$ is any value from about 0.1 to about 0.8 and $y$ is any value from about 0 to about 8.

The formula for Zeolite Z in terms of oxide mole ratios may be written as:

$$K_2O:Al_2O_3:2SiO_2:yH_2O$$

wherein y is any value not exceeding 3.

The formula for Zeolite E in terms of oxide mole ratios may be written as:

$$0.9 \pm 0.1 M_{2/n}O:Al_2O_3:1.95 \pm 0.1 SiO_2:yH_2O$$

wherein M is a metal cation, n is the valence of the cation, and y is a value of 0 to 4.

The formula for Zeolite F in terms of oxide mole ratios may be written as:

$$0.95 \pm 0.15 M_{2/n}O:Al_2O_3:2.05 \pm 0.3 SiO_2:yH_2O$$

wherein M is a metal cation, n is the valence of the cation, and y is any value from 0 to about 3.

The formula for Zeolite Q expressed in terms of oxide mole ratios, may be written as:

$$0.95 \pm 0.05 M_{2/n}O:Al_2O_3:2.2 \pm 0.05 SiO_2:yH_2O$$

wherein M is a metal cation, n is the valence of the cation, and y is any value from 0 to 5.

The formula for Zeolite B may be written in terms of oxide mole ratios as:

$$1.0 \pm 0.2 M_{2/n}O:Al_2O_3:3.5 \pm 1.5 SiO_2:yH_2O$$

wherein M represents a metal cation, n is the valence of the cation, and y has an average value of 5.1 but may range from 0 to 6.

Other synthesized crystalline aluminosilicates include those designated as ZK–4 and ZK–5.

ZK–4 can be represented in terms of mole ratios of oxides as:

0.1 to 0.3R:0.7 to $1.0 M_{2/n}O:Al_2O_3$:2.5 to $4.0 SiO_2:yH_2O$ wherein R is a member selected from the group consisting of methylammonium oxide, hydrogen oxide and mixtures thereof with one another, M is a metal cation, n is the valence of the cation, and y is any value from about 3.5 to about 5.5. As usually synthesized, Zeolite ZK–4 contains primarily sodium cations and can be represented by unit cell formula:

$$7.5 \pm 2Na:2 \pm 0.5H:9 \pm 2AlO_2:15 \pm 2SiO_2$$

The major lines of the X-ray diffraction pattern of ZK–4 are set forth in Table 1 below:

TABLE 1

| d Value of Reflection in A.: | 100I/I₀ |
|---|---|
| 12.00 | |
| 9.12 | 100 |
| 8.578 | 29 |
| 7.035 | 73 |
| 6.358 | 52 |
| 5.426 | 15 |
| 4.262 | 23 |
| 4.062 | 11 |
| 3.662 | 49 |
| 3.391 | 65 |
| 3.254 | 30 |
| 2.950 | 41 |
| 2.725 | 54 |
| 2.663 | 10 |
| 2.593 | 7 |
| 2.481 | 15 |
| 2.435 | 2 |
| 2.341 | 1 |
| 2.225 | 2 |
| 2.159 | 2 |
| 2.121 | 4 |
| 2.085 | 5 |
| 2.061 | 2 |
| 2.033 | 2 |
| 1.90 | 5 |
| | 2 |

| d Value of Reflection in A.:—Continued | 100I/I₀ |
|---|---|
| 1.880 | 2 |
| 1.828 | 1 |
| 1.813 | 1 |
| 1.759 | 1 |
| 1.735 | 1 |
| 1.720 | 1 |
| 1.703 | 5 |
| 1.669 | 1 |
| 1.610 | 2 |
| 1.581 | 1 |
| 1.559 | 2 |
| | 1 |

ZK–4 can be prepared by preparing an aqueous solution of oxides containing $Na_2O$, $Al_2O_3$, $SiO_2$, $H_2O$ and tetramethylammonium ion having a composition, in terms of oxide mole ratios, which falls within the following ranges:

| | |
|---|---|
| $SiO_2/Al_2O_3$ | 2.5 to 11 |
| $\dfrac{Na_2O}{Na_2O + [(CH_3)_4N]_2O}$ | 0.5 to 2.5 |
| $\dfrac{H_2O}{Na_2O + [(CH_3)_4N]_2O}$ | 25 to 50 |
| $\dfrac{Na_2O + [(CH_3)_4N]_2O}{SiO_2}$ | 1 to 2 | maintaining the mixture at a temperature of about 100° C. to 120° C. until the crystals are formed, and separating the crystals from the mother liquor. The crystal material is thereafter washed until the wash effluent has a pH essentially that of wash water and subsequently dried.

ZK–5 is representative of another crystalline aluminosilicate which is prepared in the same manner as Zeolite ZK–4 except that N,N′-dimethyltriethylenediammonium hydroxide is used in place of tetramethylammonium hydroxide. ZK–5 may be prepared from an aqueous sodium aluminosilicate mixture having the following composition expressed in terms of oxide mole ratios as:

| | |
|---|---|
| $SiO_2/Al_2O_3$ | 2.5 to 11 |
| $\dfrac{Na_2O}{Na_2O + [(CH_2)_6N_2(CH_3)_2]OH}$ | 0.5 to 2.5 |
| $\dfrac{H_2O}{Na_2O + [(CH_2)_6N_2(CH_3)_2]OH}$ | 25 to 50 |
| $\dfrac{Na_2O + [(CH_2)_6N_2(CH_3)_2]OH}{SiO_2}$ | 1 to 2 |

The N,N′-dimethyltriethylenediammonium hydroxide used in preparing ZK–5 can be prepared by methylating 1,4-diazabicyclo(2.2.2)-octane with methyl iodide or dimethyl sulfate, followed by conversion to the hydroxide by treatment with silver oxide or barium hydroxide. The reaction may be illustrated as follows:

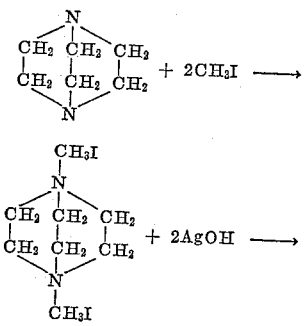

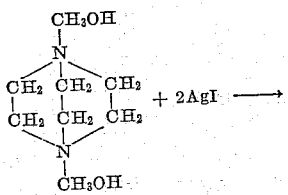

In using the N,N′-dimethyltriethylenediammonium hydroxide compound in the preparation of ZK-5, the hydroxide may be employed per se, or further treated with a source of silica, such as silica gel, and thereafter reacted with aqueous sodium aluminate in a reaction mixture whose chemical composition corresponds to the above-noted oxide mole ratios. Upon heating at temperatures of about 200 to 600° C., the methyl ammonium ion is converted to hydrogen ion.

Of the synthetic aluminosilicates, the synthetic faujasite (i.e., X and Y) and those of the L series produce most advantageous results in the process of the present invention.

Quite obviously, the above-listed molecular sieves are only representative of the synthetic crystalline aluminosilicate zeolite molecular sieve catalysts which may be used in the process of the present invention, the particular enumeration of such sieves not being intended to be exclusive.

At the present time, two commercially available molecular sieves are those of the A series and the X series. A synthetic zeolite known as "Molecular Sieve 4A" is a crystalline sodium aluminosilicate having an effective pore diameter of about 4 Angstroms. In the hydrated form, this material is chemically characterized by the formula:

$$Na_{12}(AlO_2)_{12}(SiO_2)_{12} \cdot 27H_2O$$

The synthetic zeolite nown as "Molecular Sieve 5A" is a crystalline aluminosilicate salt having an effective pore diameter of about 5 Angstroms and in which substantially all of the 12 ions of sodium in the immediately above formula are replaced by calcium, it being understood that calcium replaces sodium in the ratio of one calcium ion for two sodium ions. A crystalline sodium aluminosilicate is also available commercially under the name of "Molecular Sieve 13X." The letter X is used to distinguish the inter-atomic structure of this zeolite from that of the A crystal mentioned above. As initially prepared and before activation by dehydration, the 13X material contains water and has the unit cell formula

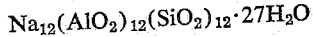

The synthetic zeolite nown as "Molecular Sieve 10X" is a crystalline aluminosilicate salt in which a substantial proportion of the sodium ions of the 13X material have been replaced by calcium.

Among the naturally occurring crystalline aluminosilicates which can be employed for purposes of the invention, the preferred aluminosilicates are those which sorb hydrocarbons above $C_3$. Exemplary of such aluminosilicates are faujasite, heulandite, clinoptilolite, dachiardite, and aluminosilicates represented as follows:

| | |
|---|---|
| Chabazite | $Na_2O \cdot Al_2O_3 \cdot 4SiO_2 \cdot 6H_2O$. |
| Gmelinite | $Na_2O \cdot Al_2O_3 \cdot 4SiO_2 \cdot 6H_2O$. |
| Mordenite | $Na_2O \cdot Al_2O_3 \cdot 10SiO_2 \cdot 6.6H_2O$. |

Other aluminosilicates which can be used are caustic treated clays and conventional composites of siliceous gels with alumina.

Of the clay materials, montmorillonite and kaolin families are representative types which include the sub-bentonites, such as bentonite, and the kaolins commonly identified as Dixie, McNamee, Georgia and Florida clays in which the main mineral constituent is halloysite, kaolinite, dickite, nacrite or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

| | |
|---|---|
| $Na_2O$/clay (dry basis) | 1.0–6.6 to 1 |
| $SiO_2$/clay (dry basis) | 0.01–3.7 to 1 |
| $H_2O/Na_2O$ (mole ratio) | 35–180 to 1 |

Molecular sieves are ordinarily prepared initially in the sodium form of the crystal. The sodium ions in such form may, as desired, be exchanged for other cations, as will be described in greater detail below. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product which crystallizes within this hot mixture is separated therefrom and water washed until the water in equilibrium with the zeolite has a pH in the range of 9 to 12. After activating by heating until dehydration is attained, the substance is ready for use.

For example, in the preparation of sodium zeolite A, suitable reagents for the source of silica include silica sol, silica gel, silicic acid or sodium silicate. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the following ranges: $SiO_2/Al_2O_3$ of 0.5 to 2.5, $Na_2O/SiO_2$ of 0.8 to 3.0 and $H_2O/Na_2O$ of 35 to 200. A convenient and generally employed process of preparation involves preparing an aqueous solution of sodium aluminate and sodium hydroxide and then adding with stirring an aqueous solution of sodium aluminate and sodium hydroxide and then adding with stirring an aqueous solution of sodium silicate.

The reaction mixture is placed in a suitable vessel which is closed to the atmosphere in order to avoid losses of water and the reagents are then heated for an appropriate length of time. Adequate time must be used to allow for recrystallization of the first amorphous precipitate that forms. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. For temperatures between room temperatures (21° C.) and 150° C. an increase in temperature increases the velocity of the reaction and decreases its duration. As soon as the zeolite crystals are completely formed they retain their structure and it is not essential to maintain the temperature of the reaction any longer in order to obtain a maximum yield of crystals.

After formation, the crystalline zeolite is separated from the mother liquor, usually by filtration. The crystalline mass is then washed, preferably with salt-free water, while on the filter, until the wash water, in equilibrium with the zeolite, reaches a pH of 9 to 12. The crystals are then dried at a temperature between 25° C. and 150° C. Activation is attained upon dehydration, as for example at 350° C. and 1 mm. pressure or at 350° C. in a stream of dry air.

It is to be noted that the material first formed on mixing the reactants is an amorphous precipitate which is, generally speaking, not catalytically active in the process of the invention. It is only after transformation of the amorphous precipitate to crystalline form that the highly active catalyst described herein is obtained.

Molecular sieves having a faujasitic crystal structure can be synthesized in a manner similar to that described hereinabove for preparation of molecular sieves of the A series. However, for such synthesis the reaction mixture should have a composition, expressed as mixtures of oxides, within the following limits: $SiO_2/Al_2O_3$ of 2 to 40; $Na_2O/SiO_2$ of 0.4 to 6.5 and $H_2O/Na_2O$ of 10 to 90. A particular synthetic faujasite, that of the X series, may be synthesized with a reaction mixture having the following composition (expressed as mixtures of oxides): $SiO_2/Al_2O_3$ of 3 to 5; $Na_2O/SiO_2$ of 1.2 to 1.5 and $H_2O/Na_2O$ of 35 to 60.

Molecular sieves of the other series may be prepared in a similar manner, the composition of the reaction mixture being varied to obtain the desired ratios of ingredients for the particular sieve in question.

The molecular sieve catalysts useable in the process of the present invention may be in the sodium form as aforesaid or may contain other cations, including other metallic cations and/or hydrogen. In preparing the non-sodium forms of the catalyst compositions, the aluminosilicate can be contacted with a non-aqueous or aqueous fluid medium comprising a gas, polar solvent or water solution containing the desired positive ion. Where the aluminosilicate is to contain metal cations, the metal cations may be introduced by means of a salt soluble in the fluid medium. When the aluminosilicate is to contain hydrogen ions, such hydrogen ions may be introduced by means of a hydrogen ion-containing fluid medium or a fluid medium containing ammonium ions capable of conversion to hydrogen ions.

In those cases in which the aluminosilicate is to contain both metal cations and hydrogen ions, the aluminosilicate may be treated with a fluid medium containing both the metal salt and hydrogen ions or ammonium ions capable of conversion to hydrogen ions. Alternatively, the aluminosilicate can be first contacted with a fluid medium containing a hydrogen ion or ammonium ion capable of conversion to a hydrogen ion and then with a fluid medium containing at least one metallic salt. Similarly, the aluminosilicate can be first contacted with a fluid medium containing at least one metallic salt and then with a fluid medium containing a hydrogen ion or an ion capable of conversion to a hydrogen ion or a mixture of both.

Water is the preferred medium for reasons of economy and ease of preparation in large scale operations involving continuous or batchwise treatment. Similarly, for this reason, organic solvents are less preferred but can be employed providing the solvent permits ionization of the acid, ammonium compound and metallic salt. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butanol, etc. and miscellaneous solvents such as dimethylformamide, and the like.

The hydrogen ion, metal cation or ammonium ion may be present in the fluid medium in an amount varying within wide limits dependent upon the pH value of the fluid medium. Where the aluminosilicate material has a molar ratio of silica to alumina greater than about 5.0, the fluid medium may contain a hydrogen ion, metal cation, ammonium ion, or a mixture thereof, equivalent to a pH value ranging from less than 1.0 up to a pH value of about 10.0. Within these limits, pH values for fluid media containing a metallic cation and/or an ammonium ion range from 4.0 to 10.0, and are preferably between a pH value of 4.5 to 8.5. For buid media containing a hydrogen ion alone or with a metallic cation, the pH values range from less than 1.0 up to about 7.0 and are preferably within the range of less than 3.0 up to 6.0. Where the molar ratio of the aluminosilicate is greater than about 3.0 and less than about 5.0, the pH value for the fluid media containing a hydrogen ion or a metal cation ranges from 3.8 to 8.5. Where ammonium ions are employed, either alone or in combination with metallic cations, the pH value ranges from 4.5 to 9.5 and is preferably within the limit of 4.5 to 8.5. When the aluminosilicate material has a molar ratio of silica to alumina less than about 3.0, the preferred medium is a fluid medium containing an ammonium ion instead of a hydrogen ion. Thus, depending upon the silica to alumina ratio, the pH value varies within rather wide limits.

In carrying out the treatment with the fluid medium, the procedure employed comprises contacting the aluminosilicate with the desired fluid medium or media until such time as metallic cations originally present in the aluminosilicate are removed to the desired extent. Repeated use of fresh solutions of the entering ion is of value to secure more complete exchange. Effective treatment with the fluid medium to obtain a modified aluminosilicate having high catalytic activity will vary, of course, with the duration of the treatment and temperature at which it is carried out. Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between about 5 and 8. The aluminosilicate material is thereafter analyzed for metallic ion content by methods well known in the art. Analysis also involves analyzing the effluent wash for anions obtained in the wash as a result of the treatment, as well as determination of and correction for anions that pass into the effluent wash from soluble substances or decomposition products of insoluble substances which are otherwise present in the aluminosilicate as impurities. The aluminosilicate is then dried and dehydrated.

The actual procedure employed for carrying out the fluid treatment of the aluminosilicate may be accomplished in a batchwise or continuous method under atmospheric, subatmospheric or superatmospheric pressure. A solution of the ions of positive valence in the form of a molten material, vapor, aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogeneous pressure. Similarly, treatments involving fusion or vapor phase contact may be employed providing the melting point or vaporization temperature of the acid or ammonium compound is below the decomposition temperature of the aluminosilicate.

A wide variety of acidic compounds can be employed with facility as a source of hydrogen ions and includes both inorganic and organic acids.

Representative inorganic acids which can be employed include acids such as hydrochloric acid, hypochlorous acid, chloroplatinic acid, sulfuric acid, sulfurous acid, hydrosulfuric acid, peroxydisulfonic acid $(H_2S_2O_8)$, peroxymonosulfuric acid $(H_2SO_5)$, dithionic acid $(H_2S_2O_6)$, sulfamic acid $(H_2NHS_3H)$, amidodisulfonic acid $[NH(SO_3H)_2]$, chlorosulfuric acid, thiocyanic acid, hyposulfurous acid ($H_2S_2O_4$), pyrosulfuric acid ($H_2S_2O_7$), thiosulfuric acid ($H_2S_2O_3$), nitrosulfonic acid ($HSO_3 \cdot NO$) hydroxylamine disulfonic acid [$(HSO_3)_2NOH$], nitric acid, nitrous acid, hyponitrous acid, carbonic acid and the like.

Typical organic acids which find utility in the process of the invention include the monocarboxylic, dicarboxylic and polycarboxylic acids which can be aliphatic, aromatic or cycloaliphatic in nature.

Representative aliphatic monocarboxylic, dicarboxylic and polycarboxylic acids include the saturated and unsaturated, substituted and unsubstituted acids such as formic acid, acetic acid, chloroacetic acid, dichloroacetic acid, trichloroacetic acid, bromoacetic acid, propionic acid, 2-bromopropionic acid, 3-bromopropionic acid, lactic acid, n-butyric acid, isobutyric acid, crotonic acid, n-valeric acid, isovaleric acid, n-caproic acid, oenanthic acid, pelargonic acid, capric acid, undecyclic acid, lauric acid, myristic acid, palmitic acid, stearic acid, oxalic acid, malonic acid, succinic acid, glutaric acid, adipic acid, pimelic acid, suberic acid, azelaic acid, sebacic acid, alkyl succinic acid, alkenylsuccinic acid, maleic acid, fumaric acid, itaconic acid, citraconic acid, mesaconic acid, glutonic acid, muconic acid, ethylidene malonic acid, isopropylidene malonic acid, allyl malonic acid.

Representative aromatic and cycloaliphatic monocarboxylic, dicarboxylic and polycarboxylic acids include 1,2-cyclohexanedicarboxylic acid; 1,4-cyclohexanedicarboxylic acid; 2-carboxy-2-methylcyclohexaneacetic acid; phthalic acid; isophthalic acid; terephthalic acid; 1,8-naphthalenedicarboxylic acid; 1,2-naphthalenedicarboxylic acid; tetrahydrophthalic acid; 3-carboxy-cinnamic acid; hydrocinnamic acid; pyrogallic acid; benzoic acid; ortho-, meta- and para-methyl, hydroxy-, chloro- bromo- and nitro-substituted benzoic acids; phenylacetic acid; mandelic acid; benzylic acid; hippuric acid; benzenesulfonic acid, toluenesulfonic acid; methanesulfonic acid and the like.

Other sources of hydrogen ions include carboxy polyesters prepared by the reaction of an excess of polycarboxylic acid or an anhydride thereof and a polyhydric alcohol to provide pendant carboxyl groups.

Still other materials capable of providing hydrogen ions are ion exchange resins having exchangeable hydrogeniums attached to base resins comprising cross-linked resinous polymers of monovinyl aromatic monomers and polyvinyl compounds. These resins are well known materials which are generally prepared by copolymerizing in the presence of a polymerization catalyst one or more monovinyl compounds, such as styrene, vinyl toluene, vinyl xylene, with one or more divinyl aromatic compounds such as divinyl benzene, divinyl toluene, divinyl xylene, divinyl naphthalene and divinyl acetylene. Following copolymerization, the resins are further treated with suitable acids to provide the hydrogen form of the resin.

Still another class of compounds which can be employed is ammonium compounds which decompose to provide hydrogen ions when an aluminosilicate treated with a solution of said ammonium compound is subjected to temperatures below the decomposition temperature of the aluminosilicate.

Representative ammonium compounds which can be employed include ammonium chloride, ammonium bromide, ammonium iodide, ammonium carbonate, ammonium bicarbonate, ammonium sulfate, ammonium sulfide, ammonium thiocyanate, ammonium dithiocarbamate, ammonium peroxysulfate, ammonium acetate, ammonium tungstate, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, ammonium valerate, ammonium lactate, ammonium malonate, ammonium oxalate, ammonium palmitate, ammonium tartrate and the like. Still other ammonium compounds which can be employed include complex ammonium compounds such as tetramethylammonium hydroxide, trimethylammonium chloride. Other compounds which can be employed are nitrogen bases such as the salts of guanidine, pyridine, quinoline, etc.

A wide variety of metallic compounds can be employed with facility as a source of metallic cations and includes both inorganic and organic salts of the metals of Groups I through VIII of the Periodic Table, with the rare earths and the metals of Groups I, II, V, VI and VIII being preferred.

Representative of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites formates, propionates, butyrates, valerates, lactates, malonates, oxalates, palmitates, hydroxides, tartrates and the like. The only limitation on the particular metal salt or salts employed is that it be soluble in the fluid medium in which it is used.

Rare earth salts may be advantageously employed. Such salts can either be the salt of a single metal or, preferably, of mixtures of metals such as a rare earth chloride or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. The rare earth chloride solution is commercially available and it contains the chlorides of a rare earth mixture having the relative composition: cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, yttrium (as $Y_2O_3$) 0.2 percent by weight, and other rare earth oxides 0.8 percent by weight. Dydmium chloride is also a mixture of rare earth chlorides, but having a low cerium content. It consists of the following rare earths determined as oxides: lanthanum, 45–46 percent by weight; cerium, 1–2 percent by weight; praseodymium, 9–10 percent by weight; neodymium, 32–33 percent by weight; samarium, 5–6 percent by weight; gadolinium, 3–4 percent by weight; yttrium, 0.4 percent by weight; other rare earths, 1–2 percent by weight. It is to be understood that other mixtures of rare earths are equally applicable in the instant invention.

Representative metal salts which can be employed, aside from the mixture mentioned above, include silver chloride, silver sulfate, silver nitrate, silver acetate, silver arsinate, silver bromide, silver citrate, silver carbonate, silver oxide, silver tartrate, calcium acetate, calcium arsenate, calcium benzoate, calcium bromide, calcium carbonate, calcium chloride, calcium citrate, beryllium bromide, beryllium carbonate, beryllium hydroxide, beryllium sulfate, barium acetate, barium bromide, barium carbonate, barium citrate, barium malonate, barium nitrite, barium oxide, barium sulfide, magnesium chloride, magnesium bromide, magnesium sulfate, magnesium sulfide, magnesium acetate, magnesium formate, magnesium stearate, magnesium tartrate, manganese chloride, manganese sulfate, manganese acetate, manganese carbonate, manganese formate, zinc sulfate, zinc nitrate, zinc acetate, zinc chloride, zinc bromide, aluminum chloride, aluminum bromide, aluminum acetate, aluminum citrate, aluminum nitrate, aluminum oxide, aluminum phosphate, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous arsenate, ferrous lactate, ferrous sulfate, nickel chloride, nickel bromide, cerous acetate, cerous bromide, cerous carbonate, cerous chloride, cerous iodide, cerous sulfate, cerous sulfide, lanthanum chloride, lanthanum bromide, lanthanum nitrate, lanthanum sulfate, lanthanum sulfide, yttrium bromate, yttrium bromide, yttrium chloride, yttrium nitrate, yttrium sulfate, samarium acetate, samarium chloride, samarium bromide, samarium sulfate, neodymium chloride, neodymium oxide, neodymium sulfide, neodymium sulfate, praseodymium chloride, praseodymium bromide, praseodymium sulfate, praseodymium sulfide, selenium chloride, selenium bromide, tellurium chloride, tellurium bromide, etc.

The aluminoslicate catalysts usable in connection with the process of the present invention may be used in powdered, granular or molded state formed into spheres or pellets of finely divided particles having a particle size of 2 to 500 mesh. In cases where the catalyst is molded, such as by extrusion, the aluminosilicates may be extruded before drying, or dried or partially dried and then extruded. The catalyst product is then preferably precalcined in an inert atmosphere near the temperature contemplated for conversion but may be calcined initially during use in the conversion process. Generally, the aluminosilicate is dried between 150° F. and 600° F. and thereafter calcined in air or an inert atmosphere of nitrogen, hydrogen, helium, flue gas or other inert gas at temperatures ranging from about 500° F. to 1500° F. for periods of time ranging from 1 to 48 hours or more.

The aluminosilicate catalysts prepared in the foregoing manner may be used as catalysts per se or as intermediates in the preparation of further modified contact masses consisting of inert and/or catalytically active materials which otherwise serve as a base, support, carrier, binder, matrix or promoter for the aluminosilicate. One embodiment of the invention is the use of the finely divided aluminosilicate catalyst particles in a siliceous gel matrix wherein the catalyst is present in such proportions that the resulting product contains about 2 to 95 percent by weight, preferably about 5 to 50 percent by weight, of the aluminosilicate in the final composite.

The aluminosilicate-siliceous gel compositions can be prepared by several methods wherein the aluminosilicate is combined with silica while the latter is in a hydrous state such as in the form of a hydrosol, hydrogel, wet gelatinous precipitate or a mixture thereof. Thus, silica gel formed by hydrolyzing a basic solution of alkali metal silicate with an acid such as hydrochloric, sulfuric, etc., can be mixed directly with finely divided aluminosilicate having a particle size less than 40 microns, preferably with the range of 2 to 7 microns. The mixing of the two components can be accomplished in any desired manner, such as in a ball mill or other type of kneading mills. Similarly, the aluminosilicate may be dispersed in a hydrogel obtained by reacting an alkali metal silicate with an acid or an alkaline coagulent. The hydrosol is then permitted to set in mass to a hydrogel which is thereafter dried and broken into pieces of desired shape, or dispersed through a nozzle into a bath of oil or other water-immiscible suspending medium to obtain spheroidally shaped "bead" particles of catalyst. The aluminosilicate-siliceous gel thus obtained is washed free of soluble salts and thereafter dried and/or calcined as desired.

The siliceous gel matrix may also consist of a plural gel comprising a predominant amount of silica with one or more metals or oxides thereof. The preparation of plural gels is well known and generally involves either separate precipitation or coprecipitation techniques in which a suitable salt of the metal oxide is added to an alkali metal silicate and an acid or base, as required, is added to precipitate the corresponding oxides. The silica content of the siliceous gel matrix contemplated herein is generally with the range of 55 to 100 weight percent with the metal oxide content ranging from zero to 45 percent. Minor amounts of promoters or other materials which may be present in the composition include cerium, chromium, cobalt, tungsten, uranium, platinum, lead, zinc, calcium, magnesium, lithium, silver, nickel and their compounds.

The aluminosilicate catalyst may also be incorporated in an alumina gel matrix conventionally prepared by adding ammonium hydroxide, ammonium carbonate, etc., to a salt of aluminum, such as aluminum chloride, aluminum sulfate, aluminum nitrate, etc., in an amount to form aluminum hydroxide, which, upon drying, is converted to alumina. The aluminosilicate catalyst can be mixed with the dried alumina or combined while the alumina is in the form of a hydrosol, hydrogel or wet gelatinous precipitate.

The crystalline aluminosilicate zeolites usable as catalysts in the present invention have rigid three-dimensional networks made up of unit cells characterized by the substantial absence of change in unit cell dimensions upon dehydration and rehydration. Highly superior results are obtained when the catalytically active aluminosilicates employed in the present process are characterized by an aluminosilicate structure, the uniform pores of which are sufficiently large to permit entry therein of the reactant containing the olefinic bond and removal therefrom of the oxygenated reaction product or products. The most effective pore size for this purpose is provided by the aluminosilicates having a faujasitic crystal structure or those of the L series, which covers an approximate range of 7 to 13 Angstrom units, though aluminosilicates having a pore size of 6 Angstrom units are also effective for the last-mentioned purpose. In addition, catalysts of calcium and/or sodium aluminosilicates which possess a uniform effective pore diameter within the approximate range of 7 to 13 Angstrom units have been found to be particularly applicable.

The oxidation process of the present invention may effectively be carried out in a direct manner by bringing the organic charge material containing the olefinic groups into contact under oxidizing conditions with the crystalline aluminosilicate catalyst in the presence of oxygen, and subsequently separating the oxygenated product formed.

The conditions of contact, insofar as is presently known, do not appear to be critical. Thus, the organic charge material may be contacted with the catalyst in the liquid or vapor state at temperatures extending from room temperature (65° F.) up to 600° F. or higher. The yield of oxygenated product is not particularly sensitive to temperature changes.

The oxygen necessary for the reaction may be made available in a variety of ways. For example, air may be mixed with the organic charge material and both passed simultaneously over the catalyst, as in Examples 4 and 5. Alternatively, the oxygen may be provided by having air initially contained in the pores of the aluminosilicate catalyst, as in Examples 1–3 and 6. Or, if desired, a material yielding oxygen in the reaction zone may be used as the source of oxygen.

The catalyst is preferably contacted with an excess of charge material, i.e., a sufficient amount to saturate the catalyst. Any unadsorbed charge material is removed from contact with the catalyst. Any adsorbed charge material undergoes conversion to oxygenated product which is removed from the catalyst.

An especially effective means for removing adsorbed product from the catalyst is by steaming. The resulting vaporous mixture is then condensed. The steam-product condensate is readily separated into layers by gravity. The product layer is then collected and dried.

The process may be carried out on a batch basis in the above-indicated manner or may be conducted continuously by passing the organic charge, steam and air simultaneously over the catalyst under conditions such that the mol ratio of organic charge material to steam to air is within the approximate range of 1:0.1:0.1 to 1:5:10.

The following examples will serve to illustrate the method of the invention without limiting the same:

Example 1

Sixty-four and two tenths (64.2) grams of a pelleted catalyst of the calcium form of the X series, i.e., "Molecular Sieve 10X," containing about 20 percent by weight of clay, were placed in a vertical glass tube with the bottom closed. Then 108 grams of alpha-methylstyrene were added to the top of the tube, so that the catalyst was soaking in the hydrocarbon. A large amount of heat was evolved during the sorption step. The system was allowed to stand for 16 hours, then the excess hydrocarbon (66 grams) was allowed to drain off the bottom of the tube. Such drainings were found to consist of a major proportion of alpha-methylstyrene dimer.

A jacket surrounding the catalyst bed was heated to a temperature of 212° F. with steam and then steam was passed upward through the catalyst bed. The vaporous product of adsorbed hydrocarbon removed by the steam was condensed. The steam-hydrocarbon condensate was collected. The hydrocarbon layer was separated and then dried over anhydrous sodium sulfate to yield 1.8 grams of acetophenone.

Example 2

Fifty-eight and four tenths (58.4) grams of a pelleted catalyst of the calcium form of the X series, i.e., "Molecular Sieve 10X," containing about 20 percent by weight of clay, were placed in a vertical glass tube with the bottom closed. A jacket surrounding the catalyst bed was water cooled. A hydrocarbon blend consisting of 115.2 grams of alpha-methylstyrene and 100.6 grams of xylene was added dropwise until the molecular sieve was soaking in the excess blend. The excess solution (169.7 grams) was then drained off the bottom.

The jacket surrounding the catalyst bed was heated to 212° F. with steam and steam was also passed upward through the catalyst bed. The vaporous product of adsorbed hydrocarbon removed by the steam was condensed. The steam-hydrocarbon condensate was collected. The hydrocarbon layer was separated and then dried over anhydrous sodium sulfate to yield 21.0 grams of product which was shown by infra-red analysis to contain the carbonyl group. Such product was established to be acetophenone by preparation of a 2,4-dinitrophenylhydrazone derivative thereof which melted at 238–243° C.

Example 3

Seventy-four and nine tenths (74.9) grams of a pelleted catalyst of "Molecular Sieve 10X" containing about 20 percent by weight of clay were placed in a vertical glass tube with the bottom closed. A jacket surrounding the catalyst bed was heated to 212° F. with steam. An excess of 2-ethylhexene-1 was added to the column so that the molecular sieve was soaking in the hydrocarbon for about 17 hours at about 212° F. The excess hydrocarbon was then drained off the bottom.

Steam was passed upward through the catalyst bed removing absorbed hydrocarbon and the resulting mixture was condensed. The steam-hydrocarbon condensate was collected. The resulting hydrocarbon layer was separated and dried over anhydrous sodium sulfate to yield 16 grams of product which was shown by infra-red analysis to contain the carbonyl group. Such product was found to consist of a mixture of ketones of various molecular weights.

Examples 4–5

A charge of 2-ethylhexene-1 was passed simultaneously with air and steam over a catalyst of "Molecular Sieve 10X" under conditions specified below. Runs were made by feeding simultaneously the olefin, steam and air continuously over the catalyst. Products collected during the run and after steam purge were analyzed for their carbonyl content. The reaction conditions and results are given in the following table:

TABLE I

|  | Example 4 | Example 5 |
|---|---|---|
| Temperature, °F | 240 | 515 |
| Charge, LHSV | 4.7 | 4.7 |
| Mol Ratio Olefin-Steam-Air | 1:0.8:0.3 | 1:1:0.3 |
| Mol Ratio Oxygen-Olefin | 0.06 | 0.06 |
| Contact Time, Sec | 0.9 | 0.6 |

Products Distriction

| | Ketones, Percent Mole (Ex. 4) | | | Ketones, Percent Mole (Ex. 5) | | |
|---|---|---|---|---|---|---|
| | Feed | Cut | Charge | Feed | Cut | Charge |
| First Half-Run Effluent | 42.0 | 3.7 | 1.6 | 47.8 | 5.5 | 2.6 |
| Second Half-Run Effluent | 43.9 | 7.8 | 3.4 | 46.4 | 6.7 | 3.1 |
| Purge | 14.1 | 9.7 | 1.4 | 5.8 | 19.9 | 1.2 |
| Total | | | 6.4 | | | 6.9 |

Example 6

One hundred grams of a pelleted catalyst of the sodium form of the X series, i.e., "Molecular Sieve 13X," containing about 20 percent by weight of clay were placed in a 2 liter rocking type autoclave. Five hundred grams of a 4.6:1 isobutane-isobutene blend were added and the mixture heated for approximately 1 hour at 400° F. The autoclave was depressured and the liquid product was distilled out of the autoclave. This liquid was predominately isobutene polymer. Inspection showed the material to have a molecular weight of 131, a bromine number of 150.7, a specific gravity of 0.7472 and a total adsorption in sulfuric acid of >98.6 percent. Fluorescent indicator analysis showed the product to be about 90 percent olefinic.

The catalyst after being removed from the autoclave had an appreciable amount of olefin polymer remaining within the pores. Twenty-five grams of this catalyst were put in a vertical glass tube and the jacket surrounding the catalyst was steam heated. Steam was passed upward through the catalyst bed removing absorbed hydrocarbon and the resulting mixture was condensed. The steam-hydrocarbon condensate was collected. The resulting hydrocarbon layer was separated and filtered. Upon analysis, the product was found to have an oxygen content of 2.63 weight percent.

When used in the claims, the expression "in the presence of oxygen" shall be construed to include oxygen per se and all materials capable of yielding oxygen for purposes of the oxidation reaction defined in such claims.

It is to be understood that the above description is merely illustrative of preferred embodiments of the in-

What is claimed is:

1. A process for catalytically converting an olefin chacterized by the formula:

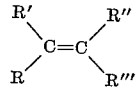

where R and R' are hydrocarbon substituents selected from the group consisting of alkyl radicals having from 1 to 18 carbon atoms and aryl radicals containing from 6 to 20 carbon atoms, and R'' and R''' are substituents selected from the group consisting of hydrogen, R and R', as above defined, to a ketone which comprises contacting said olefin with a solid porous catalyst, having air initially absorbed in the pores thereof, consisting essentially of a material selected from crystalline alkali metal and alkaline earth metal aluminosilicates having rigid three-dimensional networks made up of unit cells characterized by the substantial absence of change in unit cell dimensions upon dehydration and rehydration and a uniform molecular sieve structure characterized by pores having an effective diameter within the approximate range of 7 to 13 Angstrom units.

2. A process for catalytically converting an olefin characterized by the formula:

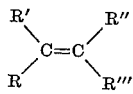

where R and R' are hydrocarbon substituents selected from the group consisting of alkyl radicals having from 1 to 18 carbon atoms and aryl radicals containing from 6 to 20 carbon atoms, and R'' and R''' are substituents selected from the group consisting of hydrogen, R and R', as above defined, to a ketone which comprises contacting an excess of said olefin with a solid porous catalyst, initially containing air in the pores thereof and consisting essentially of a material selected from crystalline alkali metal and alkaline earth metal aluminosilicates having rigid three-dimensional networks made up of unit cells characterized by the substantial absence of change in unit cell dimensions upon dehydration and rehydration and a uniform molecular sieve structure characterized by pores having an effective diameter within the approximate range of 7 to 13 Angstrom units, removing excess unadsorbed olefin from contact with the catalyst and steaming adsorbed product from the catalyst.

3. A process for catalytically converting an olefin characterized by the formula:

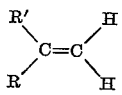

where R is an alkyl radical having from 1 to 18 carbon atoms and R' is an aryl radical containing from 6 to 20 carbon atoms, to a ketone which comprises contacting said olefin with a solid porous catalyst having air initially adsorbed in the pores thereof, consisting essentially of a material selected from crystalline alkali metal and alkaline earth metal aluminosilicates having rigid three-dimensional networks made up of unit cells characterized by the substantial absence of change in unit cell dimensions upon dehydration and rehydration and a uniform molecular sieve structure characterized by pores having an effective diameter within the approximate range of 7 to 13 Angstrom units.

4. A process for catalytically converting aplha-methylstyrene to acetophenone which comprises contacting alpha-methylstyrene with a solid porous catalyst having air initially adsorbed in the pores thereof, consisting essentially of a material selected from crystalline alkali metal and alkaline earth metal aluminosilicates having rigid three-dimensional networks made up of unit cells characterized by the substantial absence of change in unit cell dimensions upon dehydration and rehydration and a uniform molecular sieve structure characterized by pores having an effective diameter within the approximate range of 7 to 13 Angstrom units.

5. A process for catalytically converting alpha-methylstyrene to acetophenone which comprises contacting alpha-methylstyrene in the presence of steam and air with a solid porous catalyst under conditions such that the mol ratio of alpha-methylstyrene to steam to air is within the approximate range of 1:0.1:0.1 to 1:5:10 and wherein said catalyst consists essentially of a material selected from crystalline alkali metal and alkaline earth metal aluminosilicates having rigid three-dimensional networks made up of unit cells characterized by the substantial absence of change in unit cell dimensions upon dehydration and rehydration and a uniform molecular sieve structure characterized by pores having an effective diameter within the approximate range of 7 to 13 Angstrom units.

6. A process for catalytically converting alpha-methylstyrene to acetophenone which comprises contacting an excess of alpha-methylstyrene with a solid porous catalyst initially containing air in the pores thereof and consisting essentially of a material selected from crystalline alkali metal and alkaline earth metal aluminosilicates having rigid three-dimensional networks made up of unit cells characterized by the substantial absence of change in unit cell dimensions upon dehydration and rehydration and a uniform molecular sieve structure characterized by pores having an effective diameter within the approximate range of 7 to 13 Angstrom units, removing excess unadsorbed alpha-methylstyrene from contact with the catalyst and steaming adsorbed acetophenone from the catalyst.

7. A process for catalytically converting an olefin characterized by the formula:

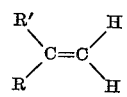

where R and R' are alkyl radicals containing from 1 to 18 carbon atoms to a ketone which comprises containing said olefin with a solid porous catalyst having air initially adsorbed in the pores thereof, consisting essentially of a material selected from crystalline alkali metal and alkaline earth metal aluminosilicates having rigid three-dimensional networks made up of unit cells characterized by the substantial absence of change in unit cell dimensions upon dehydration and rehydration and a uniform molecular sieve structure characterized by pores having an effective diameter within the approximate range of 7 to 13 Angstrom units.

References Cited

UNITED STATES PATENTS

| | | | |
|---|---|---|---|
| 1,694,122 | 12/1928 | Jaeger | 260—598 |
| 2,523,686 | 9/1950 | Engel | 260—597 |
| 2,882,243 | 4/1959 | Milton. | |
| 2,882,244 | 4/1959 | Milton. | |
| 3,140,251 | 7/1964 | Plank et al. | |

LEON ZITVER, *Primary Examiner.*

LORRAINE WEINBERGER, *Examiner.*

D. D. HORWITZ, *Assistant Examiner.*